Figure 1:
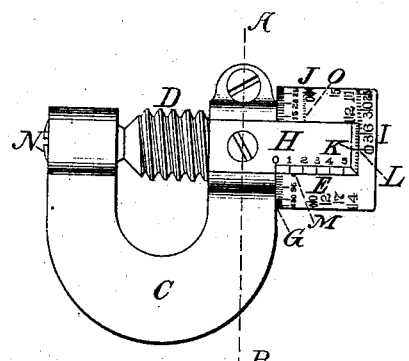

(Model.)

S. DARLING.
Micrometer Gage for Wire and Sheet Metal.

No. 235,133. Patented Dec. 7, 1880.

Witnesses:
Benj. Gridley
Chas. H. Willes

Inventor:
Samuel Darling

UNITED STATES PATENT OFFICE.

SAMUEL DARLING, OF PROVIDENCE, RHODE ISLAND.

MICROMETER-GAGE FOR WIRE AND SHEET METAL.

SPECIFICATION forming part of Letters Patent No. 235,133, dated December 7, 1880.

Application filed July 22, 1880. (Model.)

*To all whom it may concern:*

Be it known that I, SAMUEL DARLING, a citizen of the United States, residing at Providence, in the county of Providence and State of Rhode Island, have invented a new and useful Improvement in a Wire and Sheet-Metal Gage; and I do hereby declare that the following is a full, clear, and exact description of the invention, which will enable others skilled in the art to which it appertains to make and use it.

The object of my invention is to make an adjustable screw-gage containing devices for performing with great accuracy and facility the functions of a wire and sheet-metal gage, the sizes corresponding with the Birmingham, Stubs, or any standard gage that may be desired; also, that shall contain a graduated scale by which articles can be measured within one-thousandth of an inch, more or less, and which will show how many thousandths of an inch each number of the wire-gage contains, and the difference in thousandths of an inch between any two numbers of the gage; and also that will show when an article does not exactly agree with any number of the gage how many thousandths of an inch it varies from it; and also to so arrange the gage that the sizes of wire or sheet metal can be conveniently given in thousandths of an inch as well as by the wire-gage; and also to make a gage that will have the least tendency to wear in use, will show when it is worn out of true, and can be readily adjusted by any person of ordinary skill.

It consists in making a screw-gage having a screw of suitable pitch, preferably ten to the inch, a sleeve or cylinder of sufficient size and attached to the screw, an indicating-arm parallel with the sleeve and beveled and graduated on one edge and end, a scale on the sleeve graduated into one hundred parts, more or less, and also a scale graduated and numbered spirally on the sleeve, corresponding to the Birmingham or some other wire-gage, numbering from 0000 to No. 36, more or less, the figures and graduation-marks being put on the sleeve in a spiral form, corresponding with the pitch of the screw, whereby, when the gage is applied to measure wire or sheet metal, the indicating-mark on the beveled end of the arm will show what gage it is if it be an exact gage, or if it be not an exact gage the edge of the arm will show how many thousandths of an inch it is more or less than the gage, and whereby it may be known how many thousandths of an inch there are in any number of the gage, or between any two numbers, so that the merchant or consumer can order goods by thousandths of an inch by the wire-gage, or by the wire-gage minus or plus any number of thousandths of an inch desired.

There are three objections to the wire and sheet-metal gages now in use: First, they cannot be made sufficiently accurate without too much expense; secondly, they soon wear out of true by the great friction they are subjected to; and, thirdly, they cannot be applied at a distance from the edge of a sheet of metal, which is necessary to get the full thickness and clear the barb on the edge of the sheet, while in my improved gage the tendency to wear is comparatively small, and when it is worn out of true it can be easily adjusted.

Figure 2:
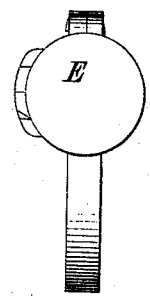
Figure 5:
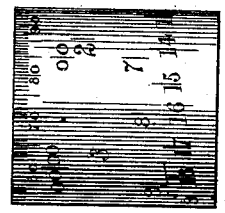
Figure 3:
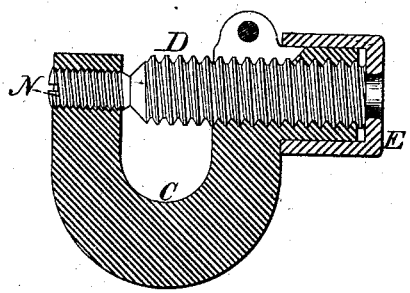
Figure 4:
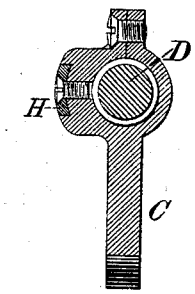

In the drawings, Figure 1 represents a side elevation of my improved gage. Fig. 2 is an end view of the same. Fig. 3 is a central longitudinal section of Fig. 1. Fig. 4 is a transverse section of Fig. 1 at line A B. Fig. 5 is an enlarged view of the sleeve, with the pitch of the spiral line of figures somewhat exaggerated.

The bow-shaped frame C may be made of steel, malleable iron, or any suitable metal. I prefer to make it of malleable iron for the sake of economy.

The screw D should be made of steel, and I should prefer to have the pitch ten to the inch.

The sleeve E may be made of steel or any suitable metal, and attached to the screw by riveting or any other method of doing such work.

The inner end of the sleeve is graduated into one hundred parts, (represented by G.) Each division of this scale reads one-thousandth of an inch in the gage.

The indicating-arm H is graduated on its edge into tenths of an inch, to correspond with each turn of the screw or the motion of the sleeve longitudinally every tenth or one hundred thousandths of an inch.

The surface of the sleeve is graduated into forty parts upon a spiral line corresponding with the thread of the screw, and these parts are numbered from 0000 to 36, to indicate the gages of plate and wire.

The indicating-mark K on the beveled end of the arm H will be exactly opposite to the zero-mark L and the edge of the arm H will be exactly on the zero-mark M when the gage is closed.

The gage is to be adjusted, when worn out of true, by turning screw N.

The graduated lines of the wire-gage from No. 36 to No. 20 are too near together to figure every line, and they may be figured to No. 20, as follows—viz., 36, 25, 22, 20, and every line after No. 20 to No. 0000. The graduated lines and figures should not be over one-tenth of an inch long, being the pitch of the screw.

The marks and figures must be put on spirally to agree with the thread of the screw, and if the figures do not agree in size with the pitch of the screw there will not be room for them without lapping onto each other. The lines of the graduated scale G are also too near to each other to be all figured, and every fifth line is figured. The wire-gage can be put on the nut under the sleeve, but it would not be so convenient for reading; also, the scale G may be put on the sleeve with the wire-gage marks by making short lines or pricks and putting them on spirally, as shown at O, Fig. 1.

A very cheap and convenient way of getting thousandths of an inch with the wire-gage is to make divisions on the end bevel of arm H on both sides of line K. When a wire or sheet of metal varies from the gage these divisions will at once show what the variation is without referring to scale G.

In case the wire-gage should be put on the nut under the sleeve the inner open end of the sleeve might be beveled, numbered, and divided into a hundred parts and the arm H dispensed with.

There are many ways in which the gage can be arranged without departing from the principle of my invention; and I do not confine myself to any specific way of constructing the gage, but claim any way of embodying the principle of the invention which is substantially the same.

Having fully described my invention, what I claim as new, and desire to secure by Letters Patent, is—

1. A wire or sheet-metal gage having, in combination, a screw and a spiral series of graduated lines and numbers corresponding to the sizes of a wire-gage, for the purpose of measuring wire or sheet metal, substantially as herein described.

2. Substantially as hereinbefore described, a wire or sheet-metal gage having a frame, C, screw D, a cylindrical sleeve, E, with spirally-graduated lines and figures corresponding with the different sizes of a wire-gage, and an indicating-arm, H, for the purpose herein set forth.

3. A wire-gage having, in combination with the frame, a screw, revolving sleeve, a graduated scale to read thousandths of an inch, more or less, a spirally-graduated scale with figures corresponding to the different sizes of a wire-gage, and an indicator, substantially as described, and for the purpose herein set forth.

SAML. DARLING.

Witnesses:
JOHN E. HALL,
HENRY R. DAVIS.